United States Patent
Lebizay et al.

(10) Patent No.: US 7,289,525 B2
(45) Date of Patent: Oct. 30, 2007

(54) INVERSE MULTIPLEXING OF MANAGED TRAFFIC FLOWS OVER A MULTI-STAR NETWORK

(75) Inventors: Gerald Lebizay, Madison, NJ (US); David W Gish, Riverdale, NJ (US); Henry M Mitchel, Wayne, NJ (US)

(73) Assignee: Intel Corporation, Santa Clara, CA (US)

( * ) Notice: Subject to any disclaimer, the term of this patent is extended or adjusted under 35 U.S.C. 154(b) by 1029 days.

(21) Appl. No.: 10/080,329

(22) Filed: Feb. 21, 2002

(65) Prior Publication Data

US 2003/0156535 A1    Aug. 21, 2003

(51) Int. Cl.
*H04L 12/28* (2006.01)
*H04L 12/56* (2006.01)

(52) U.S. Cl. ............. 370/425; 370/394; 370/395.43; 370/412; 370/230

(58) Field of Classification Search ............. 370/230, 370/235, 394, 395.3, 412, 425
See application file for complete search history.

(56) References Cited

U.S. PATENT DOCUMENTS

| | | | | |
|---|---|---|---|---|
| 5,991,867 A | * | 11/1999 | Fosmark | 712/16 |
| 6,046,988 A | * | 4/2000 | Schenkel et al. | 370/254 |
| 6,292,465 B1 | * | 9/2001 | Vaid et al. | 370/230 |
| 6,976,087 B1 | * | 12/2005 | Westfall et al. | 709/238 |
| 2002/0118644 A1 | * | 8/2002 | Moir | 370/230.1 |
| 2002/0120720 A1 | * | 8/2002 | Moir | 709/220 |
| 2002/0145981 A1 | * | 10/2002 | Klinker et al. | 370/244 |

* cited by examiner

*Primary Examiner*—Edan Orgad
*Assistant Examiner*—Venkatesh Haliyur
(74) *Attorney, Agent, or Firm*—Pillsbury Winthrop Shaw Pittman LLP (57) ABSTRACT

A method for inverse multiplexing of managed traffic flows over a multi-star switch network includes a source node classifier. The source node classifier, using a traffic-engineering algorithm, classifies incoming traffic based on flow parameters, embeds the flow parameters in a routing table in a node for a flow, places packets from classified flows into Switch-Specific Managed-Traffic Queues (SSMT) and a source node unmanaged traffic queue. A source node switch input scheduler process for a switch selects all managed packets from the SSMT destined for the switch, then selects a single unmanaged packet from the source node unmanaged traffic queue. The source node transmits the packets as classified flows through a switch fabric to the destination node. At the destination node packets transmitted through the switch fabric are sorted by a Switch Output Process and sent to intended output queues.

33 Claims, 6 Drawing Sheets

INVERSE MULTIPLEXING OF MANAGED TRAFFIC FLOWS OVER A MULTI-STAR NETWORK

BACKGROUND OF THE INVENTION

1. Field of the Invention

The present invention generally relates to computing systems, and specifically to systems that use packet-switching fabrics, such as the InfiniBand architecture.

2. Discussion of the Related Art

In current-generation computers, the central processing unit (CPU) is connected to the system memory and to peripheral devices by a shared parallel bus, such as the Peripheral Component Interface (PCI) bus or the Industry Standard Architecture (ISA) bus. Essentially, a bus is the channel or path between components in a computer. Likewise, current server to server connections and links to other server-related systems, such as remote storage and networking devices, depend on parallel bus technology. Server design dependent on a shared bus input/output (I/O) architecture may deliver for example 512 MB/sec of potential bandwidth that is shared among devices connected to the bus. As additional connections are added to the server, potential performance-per-connection decreases and I/O contentions escalate.

As data path-widths grow, and clock speeds become faster, the shared parallel bus becomes too costly and complex to keep up with system demands. In response, the computer industry is working to develop a next-generation bus standard. Many of the proposed new standards have something in common. They propose doing away with the shared-bus technology used in PCI and moving to a point-to-point switching connection. Thus, the computer industry is moving towards fast, packetized, serial input/output bus architectures, in which computing hosts and peripherals are linked by a switching network, commonly referred to as a switching fabric. A number of architectures of this type have been proposed, and the first next-generation standard is already in place. InfiniBand has been advanced by a consortium headed by a group of industry leaders.

The InfiniBand architecture is an I/O infrastructure technology that simplifies and speeds server-to-server connections and links to other server related systems, such as remote storage and network devices. The Infiniband fabric is the central network of connections between servers and remote networking and storage devices within a data center. Infiniband architecture also constructs highly available data centers through multiple levels of redundancy. By connecting nodes via multiple links, Infiniband systems continue to perform even if one link fails. For increased reliability, multiple switches in a fabric provide redundant paths that allow for seamless re-routing of data through the fabric should a link between switches fail. Completely redundant fabrics may be configured for the highest level of reliability and may continue to perform even if an entire fabric fails.

A common problem for any network is how to provide Quality of Service (QoS) through a network. To provide QoS, the network traffic must be differentiated. Some traffic should be handled in one way, other traffic another.

For example, an entity may set up a Service Level Agreement (SLA) with a network service provider (the entity that is providing the network), that specifies that the entity's traffic will always have available a certain bandwidth (e.g., 10 Megabits per second, or 10 Mbps) and latency (e.g., less than 1 millisecond, or ms). Then, whenever a packet is detected that comes from or is going to that entity, the packet should receive special handling. If the overall flow to the entity is currently less than 10 Mbps, then the packet should get through without being dropped and with a latency of less than 1 ms. This type of flow is said to be handled by Assured Forwarding (AF). Packets arriving when the current flows are greater than 10 Mbps will be handled differently, perhaps as Best Effort (BE) traffic (see below).

As another example, a router could be set up to recognize certain types of flows as real-time flows. Real-time flows are characterized by the idea that if the packet doesn't arrive in time it might as well not arrive at all. For example, a packet of voice data in a telephone conversation has to be available at the receiver when it is needed, or it is useless. Too late, and it cannot be used and will just be discarded. So real-time traffic (a stream of packets) belonging to a voice conversation should be handled by a class of behavior known as Expedited Forwarding (EF). A packet handled this way will be forwarded very quickly (with low latency). Hopefully, the variation in latency (known as jitter) will also be low. As a tradeoff, packets in such a stream may be simply dropped if their aggregate bandwidth exceeds a certain threshold. Also, a SLA covering such packets may be expensive to the buyer because providing this kind of service requires that a router have features that make it expensive to build.

A third example is for traffic that is not covered by any SLA, which is called Best Effort (BE) traffic. This type of traffic is typically found now across the Internet. Best effort packets may be dropped for any reason, and have no particular guarantees about latency or jitter.

Therefore, one of the side effects of using multi-switch architectures is the need to decide which packets go on a switch, because any switch can get to any destination. Many possible algorithms may be implemented to aggregate data across multiple InfiniBand switch sub-networks. Accordingly, there is a need for an algorithm that is simple, fast, fair, and robust.

DETAILED DESCRIPTION

The invention exists within the context of connecting multiple entities within a system (generally multiple boards within a system), using multiple InfiniBand switch sub-networks.

Figure 1:
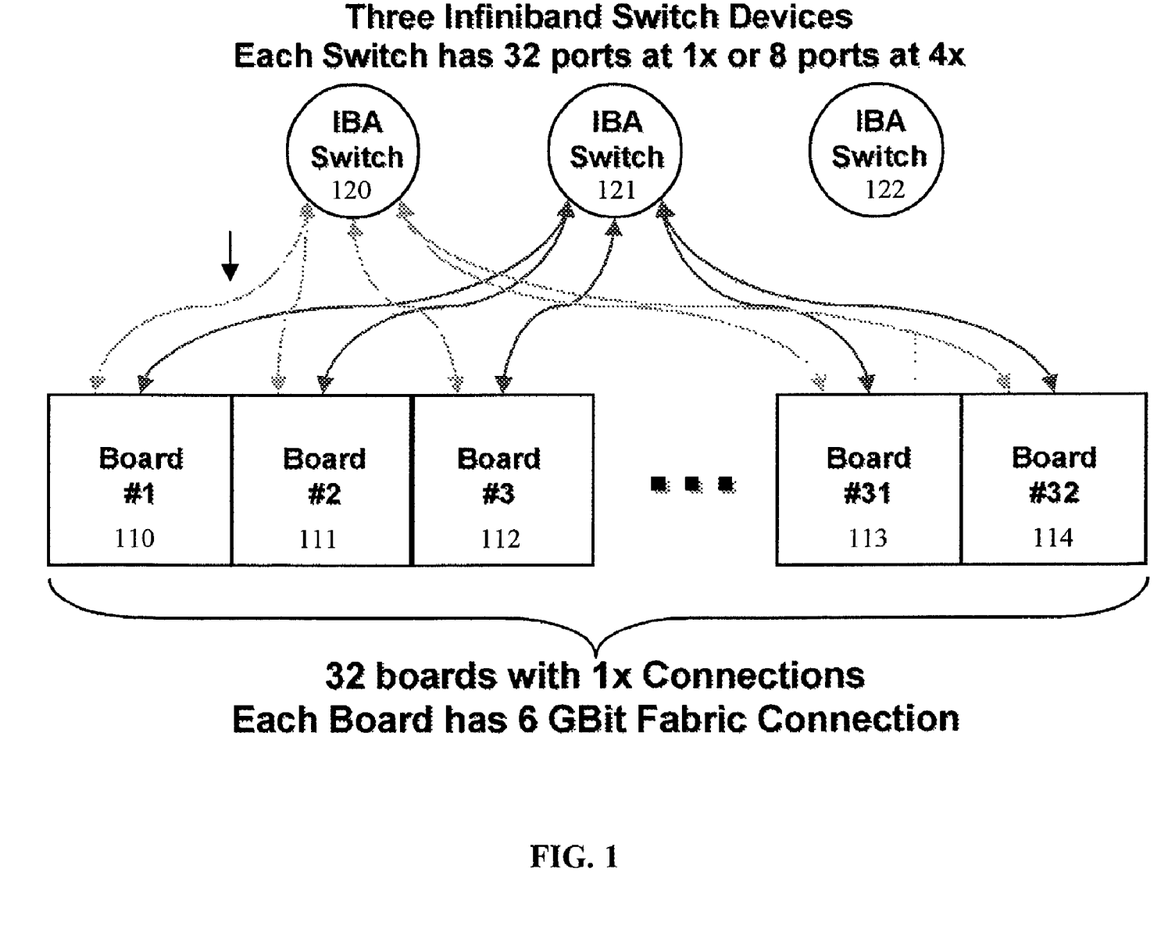
FIG. 1 illustrates a InfiniBand multi-star fabric with up to 32 boards interconnected to three InfiniBand switch devices according to an embodiment of the present invention.
Figure 2:
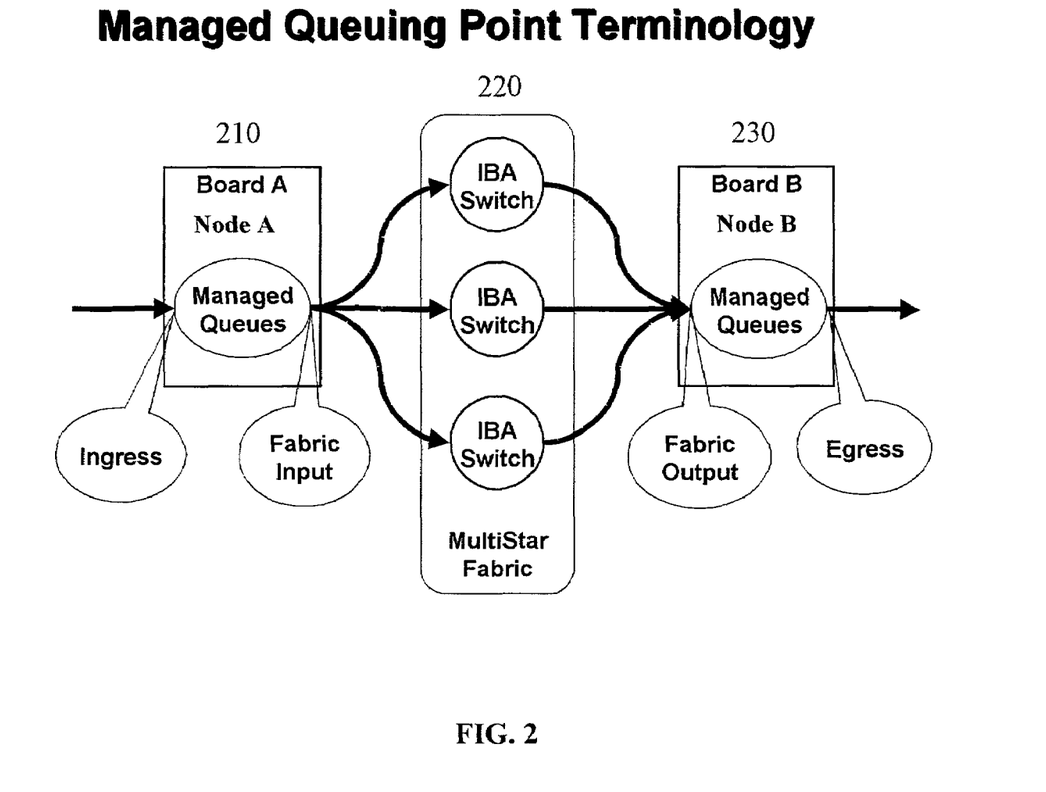
FIG. 2 illustrates an InfiniBand multi-star fabric connected to a source node A/board A and a destination node B/board B according to an embodiment of the present invention.

The number of sub-networks is not important, so long as it is two or more. FIG. 1 illustrates an InfiniBand multi-star fabric with up to 32 boards 110, 111, 112, 113, 114 interconnected to three InfiniBand switch devices 120, 121, 122. FIG. 2 illustrates an InfiniBand multi-star fabric 220 connected to a source node A/board A 210 and a destination node B/board B 230. A multi-star switch fabric is a set of parallel stars, each star consisting of a single switch which is connected to every node; the switches are not interconnected in any way.

Figure 3:
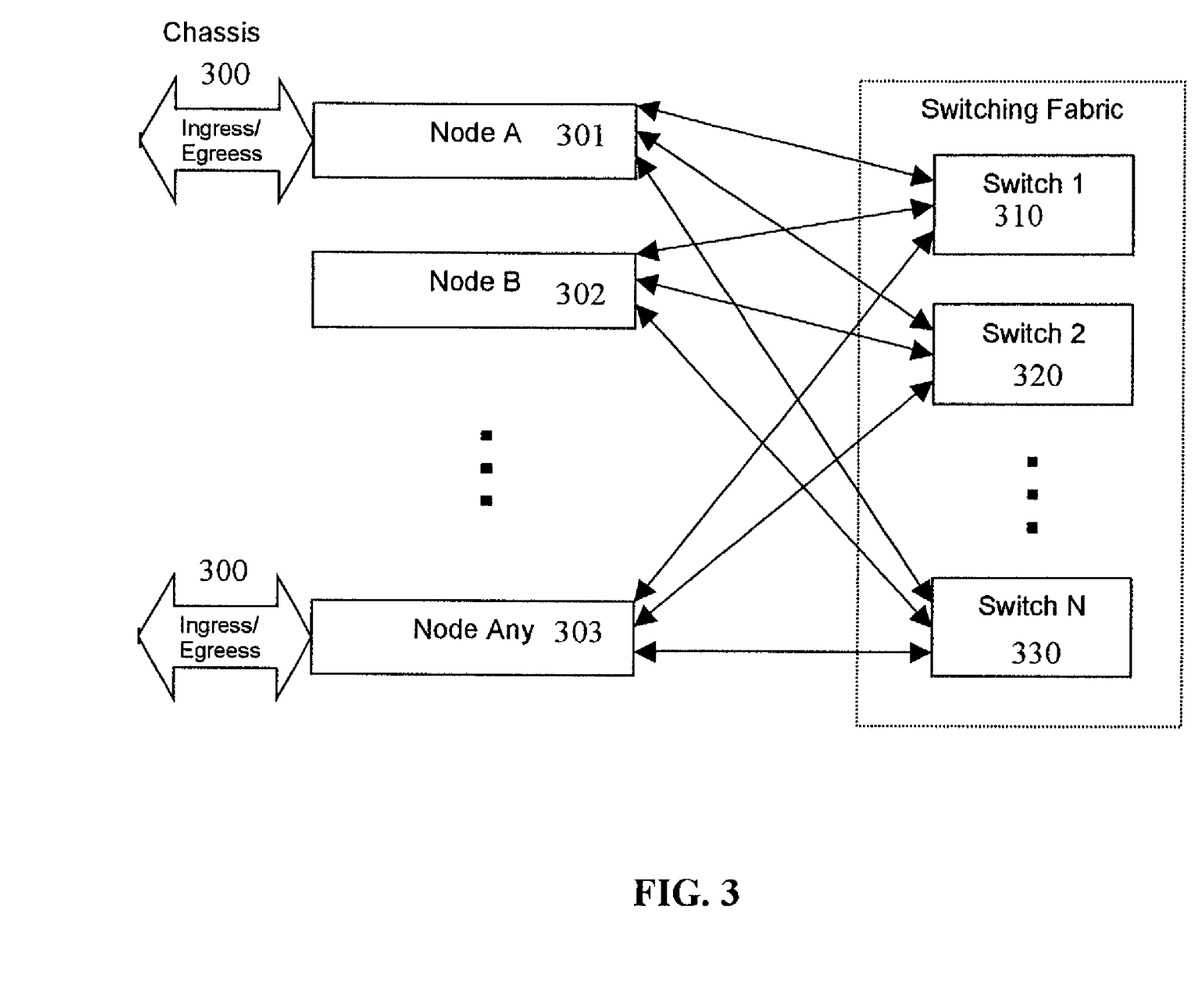
FIG. 3 illustrates multiple nodes connected to multiple switches according to an embodiment of the present invention.

Refering to FIG. 3, the entities (boards or nodes) 301, 302, 303 provide different levels of service for each packet flow through the system. Nodes 301, 302, 303 are composed of one or more electronic processors that together perform the functions of the present invention. Nodes 301, 302, 303 communicate with each other by sending packets through switches 310, 320, 330, via links. Because each node 301, 302, 303 connects to multiple switches 310, 320, 330, each node 301, 302, 303 can send packets to another node 301, 302, 303 via multiple paths (specifically, one or more per switch)

Links are the connections between nodes and switches (or node to node, or switch to switch, in general). They are capable of transmitting no more than a certain amount of information at any one time, known as bandwidth. Bandwidth may be measured, for example, in bits/second. In general, there is no restriction on the number of switches (N) except that it be greater than 1.

A flow is a set of packets that all share a set of characteristics. Typically, the characteristics include the source and destination address of the packet, as well as its protocol type and possibly its priority or classification. It is important that all the packets in a flow maintain a certain sequence in which they were sent, preferably arriving at their destination in that same sequence. If they do arrive out of sequence they can be re-sequenced, or put back in order, however, it requires a lot more work to re-sequence packets at the end. Therefore, a good design attempts to keep all the packets in a flow in sequence all through the network so that they arrive at the far end in sequence and do not require re-sequencing.

For example, if two persons are communicating via Internet (IP) telephony, there are four flows involved. The data stream from each side to the other, which carries the voice, and a control stream from each side to the other, by which each side tells the other how well the data is coming through. Each of the data streams is composed of a sequence of packets, each one containing only a short snatch of conversation, perhaps only 5 milliseconds long. Thus, there are 200 packets required to carry each single second of the phone conversation. It would be best if the packets were to arrive in the same sequence in which they were sent. If in fact a few packets are switched around the system will still work, however, it is prefered if they all flow out in the same sequence that they came in.

Managed traffic consists of the set of flows that the system operator seeks to ensure gets through the system within certain bounds. For example, the operator might be paid to make sure that all the traffic from a particular source network to a particular destination network gets through with no loss (no dropped packets), and with bounded latency and jitter (latency is the amount of time it takes for a packet to traverse the system, and jitter is the mean change in latency from packet to packet). Because managed traffic is a revenue source, it is worth building a system that can enforce its requirements.

There are two kinds of managed traffic flows: those for which bandwidth is negotiated prior to the flow starting, known as Bandwidth-Negotiated Managed Traffic (BNMT), and those for which bandwidth is not negotiated ahead of time, known as Un-negotiated Managed Traffic (UMT).

Bandwidth-Negotiated Managed Traffic (BNMT) includes flows related to services that have known or easily estimated bandwidths, such as Voice over IP (VoIP), where a data flow fitting a particular profile might take about 64 Kbps. A VoIP data flow fitting a different profile may take only 20 Kbps. The point is, the fact that the flow is going to happen is established ahead of time (by two parties setting up a VoIP channel), and the bandwidth of the channel is known before the data flow begins.

Another kind of BNMT flow is an aggregate for which the operator does not know its exact bandwidth requirements, but for which it is important enough to reserve bandwidth. An example of this kind of traffic is internal control traffic within the system itself. The various nodes must communicate control information between themselves, and this traffic is very high priority—it must be processed with minimal latency. For this kind of BNMT, the operator estimates the amount of bandwidth needed and reserves it ahead of time.

Un-negotiated Managed Traffic (UMT) includes all managed traffic that is not BNMT. For example, there might be an agreement for all of the traffic from a certain source network to a certain destination network to be able to flow through with minimal latency and loss, up to a preset limit of bandwidth, and then everything over that would be treated as unmanaged traffic. In this case, the aggregate is managed, but one does not know how much bandwidth each individual flow within the aggregate will consume.

All other traffic is un-managed traffic (UT). The bulk of Internet traffic is un-managed traffic (UT). Un-managed traffic is often called Best Effort because that is all the effort that is expected on the part of the system. A network should do its best to get the packet through. However, it is acceptable if it is dropped, re-sequenced, or held for several minutes.

The present invention includes how the managed traffic flow is implemented. More specifically, how any node chooses the path that a packet of managed traffic (BNMT or UMT) will take to any other node. The node must choose the switches, from 1 to N, to which it will send the packet.

Figure 4:
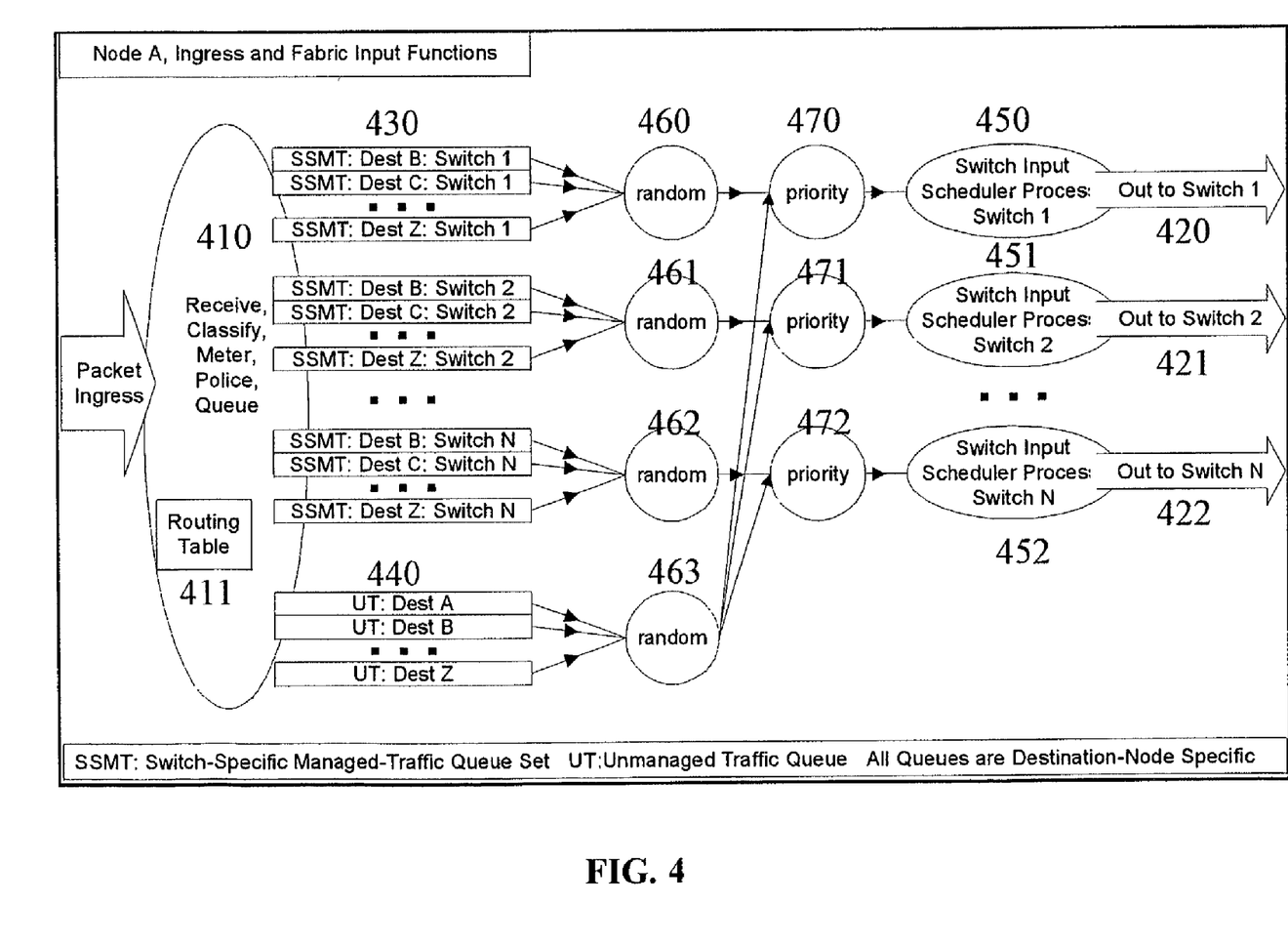
FIG. 4 illustrates processing of packets from ingress to fabric input according to an embodiment of the present invention.

Processing of packets from ingress to fabric input is shown in FIG. 4. Depicted is the flow of packets through a single node going to the switches 420, 421, 422. A single classifier 410 on the node classifies all incoming traffic to a particular flow. The flow defines a set of parameters including the destination node (A-Z), the path by which it will get to the destination node (switches 1-N, 420, 421, 422), and classification (managed or unmanaged). The individual packets end up in queues 430, 440 according to the classification.

There is a separate set of queues 430 for every destination node, per switch, for managed traffic. The set of queues is shown as a single box for simplicity; and is labeled SSMT, for Switch-Specific Managed-Traffic Queues.

Multiple queues are maintained per switch for two reasons. The primary reason is that multiple queues provide a steering function. After classification, the switch has been identified. If the packets were put back into the same queue, the switch information would have to be carried along with the packet. This scheme is in fact done in some implementations. However, separating the packets into separate queues is another way to carry the information.

The second reason is to prevent head-of-line blocking by a switch. This occurrence should be a rare condition (the switches should not back up very often, but it can happen, and separate queues prevent this condition). This head-of-line blocking would occur if there were only a single queue, and if, for example, a packet slated to go through switch 1 310 were in front of a packet slated to go through switch 2 320, and switch 1 310 was heavily loaded but switch 2 was not. The packet slated to go to switch 1 310 would be unable to be taken off the queue because switch 1 310 would be unavailable, and it would block the packet slated for switch 2 320, even though the packet slated for switch 2 320 could go if it could get off the queue.

The method for deciding which path a flow should take incorporates selection of a switch based upon a traffic-engineering algorithm. The decision is embedded in a routing table 411 in the node for that flow. A routing table 411 specifies for each flow where it should go after it leaves the node. The invention specifies that the traffic-engineering algorithm also encodes the switch 420, 421, 422 through which the flow should go.

Further, at the same time as the initial traffic-engineering decision is made or later, a backup path is determined. The backup path is pre-calculated so that if the original path fails the flow can be switched to the backup without dropping any packets.

For BNMT, the traffic-engineering algorithm can operate on known information. Because the flow bandwidth reservation has been previously established, the load-balancing algorithm places the flow however it likes. This placement may be, for example, on the switch with the currently smallest amount of managed traffic. Or it might be that the traffic-engineering algorithm prefers to place all flows of some similar type (by whatever classification it prefers) together on the same switch.

There are two options for UMT. In the first, the traffic-engineering algorithm operates on the aggregate bandwidth that was agreed upon. i.e., when the flow is initially established it will fall into a managed class for which there is a pre-negotiated aggregate bandwidth. The traffic-engineering algorithm can choose to place all the traffic for that aggregate on a particular switch and its backup on a different switch. Working in this way, the load-balancer is essentially classifying the UMT traffic into an aggregated BNMT class, and then placing that aggregate flow wherever it should go.

The second option for handling a UMT flow is to assign it to a particular switch, and then meter it (that is, determine its average bandwidth) for a while. Then, the traffic-engineering algorithm can decide where to actually place the flow just as it did with BNMT.

Therefore, when a managed flow starts, the traffic-engineering algorithm assigns the flow to a particular switch 410, 421, 422. At the same time, the traffic-engineering algorithm specifies a backup switch to carry the traffic if the primary switch fails. The traffic-engineering algorithm places both the primary and backup switch information into the routing table 411 for the flow. That information then determines the switch on which the flow is carried, thereby ensuring that packets for a particular flow are not mis-ordered.

In order for the traffic-engineering algorithm to assign the flow to a particular switch, it needs to know (or have an estimate of) the bandwidth that the flow will consume. It has three options to use for this information: When BNMT flow starts, its individual bandwidth requirement is known. When a UMT flow starts, its flow bandwidth is not known a priori. So, it can be considered to be part of an aggregate for which the bandwidth is known; Or, it can be assigned initially, its bandwidth measured, and then the measured value used to correct (if necessary) the initial assignment.

All traffic that is not managed is by definition unmanaged, and flows into the queues labeled UT, for Unmanaged Traffic Queues 440, one per destination node.

There is on each node, for each switch, a Switch Input Scheduler Process 450, which takes packets from the node's queues 430 and sends them to a particular switch 420, 421, 422. There is one such process for each switch, on each node. This is the process that handles selecting which queue 430 should be serviced next, for each switch 420, 421, 422.

Multiple queues 430 are also maintained per destination node for the same switch in order to allow randomization between the destination flows through each single switch. This arrangement is an optimization discussed below.

When multiple nodes are sending data to the same destination node at the same time, the destination node can become temporarily overloaded. This occurrence can happen particularly when some process happens to create synchronization between the various input nodes sending to the single destination node. Such synchronization may occur in the same way that Transmission Control Protocol (TCP) flows become synchronized through a router if a tail-drop policy is used for policing the input queues rather than a Random Early Drop (RED) policy.

Similarly, multiple nodes might inadvertently send data all to the same switch at one time. Although the average load could be low, the instantaneous load on the switch could be quite high and cause problems.

One way to smooth out such spikes is to introduce a random element into the scheduling of packets. It is preferrable that the random element is unable to inadvertently synchronize across the source nodes, or else it could make the situation worse rather than better.

Assuming that one wishes to perform the randomization to smooth out the traffic, one does so by splitting out the queues so that each destination node has its own separate set of managed queues 430 and its own unmanaged queue 440, as shown in FIG. 4.

A randomizer function 460, 461, 462, 463 is added behind each set of queues 430, 440, which randomly decides which destination node queue 430, 440 is going to be serviced next.

The randomizer 460, 461, 462, 463 works after the normal queue scheduling functions, so that the managed queues 430, for example, still retain their BNMT flow vs. UMT flow behaviors.

When the switch input scheduler process 450, 451, 452 for a particular switch needs to retrieve a packet, it pulls from its priority queue 470, 471, 472 (i.e. managed vs. unmanaged), which:

1) Pulls first from the randomizer for the managed queues 460, 461, 462.
   a. If there are packets available in the managed queues 430, the managed queue randomizer 460, 461, 462 pulls through the standard queue pulling mechanism. For example, the Bandwidth Negotiated Managed Traffic (BNMT) queues would be polled first, then the Un-negotiated Managed Traffic (UMT) queues. Note that the randomizer has to poll all of the BNMT queues and randomly select from those available before polling any of the UMT queues.
2) If there are no packets available in the managed queues 460, 461, 462, switch input scheduler process 450, 451, 452 pulls from the randomizer for the unmanaged queues 463. If there are packets available, it selects one queue randomly from those available and returns that queue's head packet.

3) Else, there are no packets available for that switch yet, and the switch input scheduler process 450, 451, 452 polls again.

Figure 5:
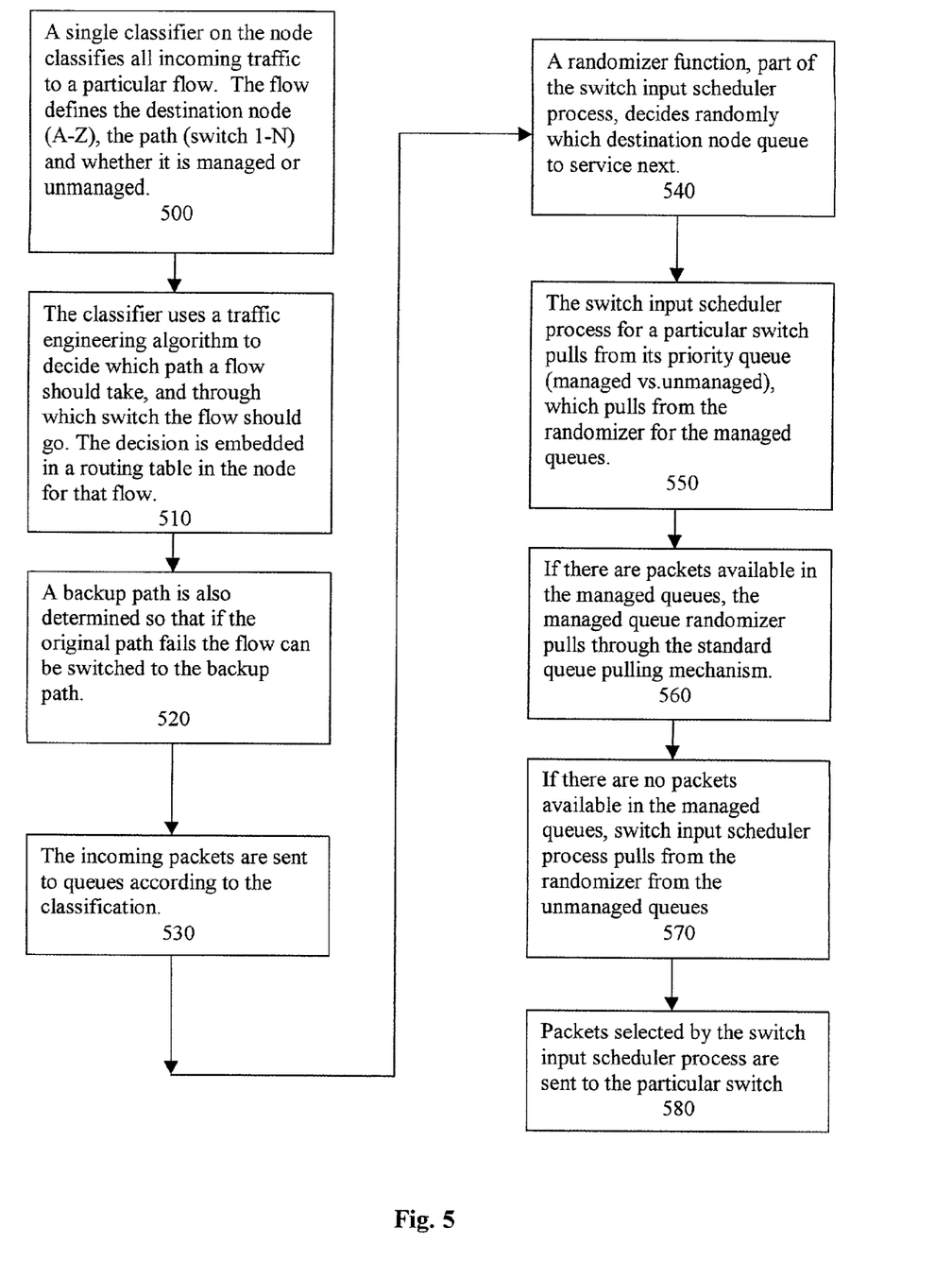
FIG. 5 illustrates a flow chart for implementation of a method for inverse multiplexing of managed traffic flow over a multi-star InfiniBand network according to an embodiment of the present invention.

FIG. 5 illustrates a flow for the implementation of a method for inverse multiplexing of managed traffic packets over a multi-star InfiniBand network. A single classifier 410, on the node classifies 500 all incoming traffic to a particular flow. The flow defines a set of parameters including the destination node (A-Z), the path by which it will get to the destination node (switches 1-N, 420, 421, 422), and classification (managed BNMT, UMT or unmanaged). The classifier uses a traffic engineering algorithm to decide which path a flow should take, and through which switch the flow should go. The decision may be embedded in a routing table in the node for that flow 510. A routing table specifies for each flow where it should go after it leaves the node. A backup path is also determined so that if the original path fails the flow can be switched to the backup path 520. The individual packets are sent to queues 430 according to the classification 530.

A Switch Input Scheduler Process 450 takes packets from the node's queues and sends them to a particular switch. There is one such process for each switch, on each node. This process handles selecting which queue should be serviced next, for each switch.

A randomizer function is a part of the Switch Input Scheduler Process. The randomizer function randomly decides 540 which destination node is going to be serviced next. When the switch input scheduler process 450, 451, 452 for a particular switch needs to retrieve 550 a packet, it pulls from its priority queue 470, 471, 472 (i.e. managed vs. unmanaged), which pulls from the randomizer for the managed queues 460, 461, 462. If there are packets available in the managed queues 430, the managed queue randomizer 460, 461, 462 pulls 560 through the standard queue pulling mechanism. If there are no packets available in the managed queues 460, 461, 462, switch input scheduler process 450, 451, 452 pulls from the randomizer from the unmanaged queues 463. If there are packets available, it selects 570 one queue randomly from those available and returns that queue's head packet. Else, there are no packets available for that switch yet, and the switch input scheduler process 450, 451, 452 polls again. Packets selected by the switch input scheduler process are sent 580 to the particular switch. The source node transmits the packets as classified flows through a switch fabric to the destination node.

Figure 6:
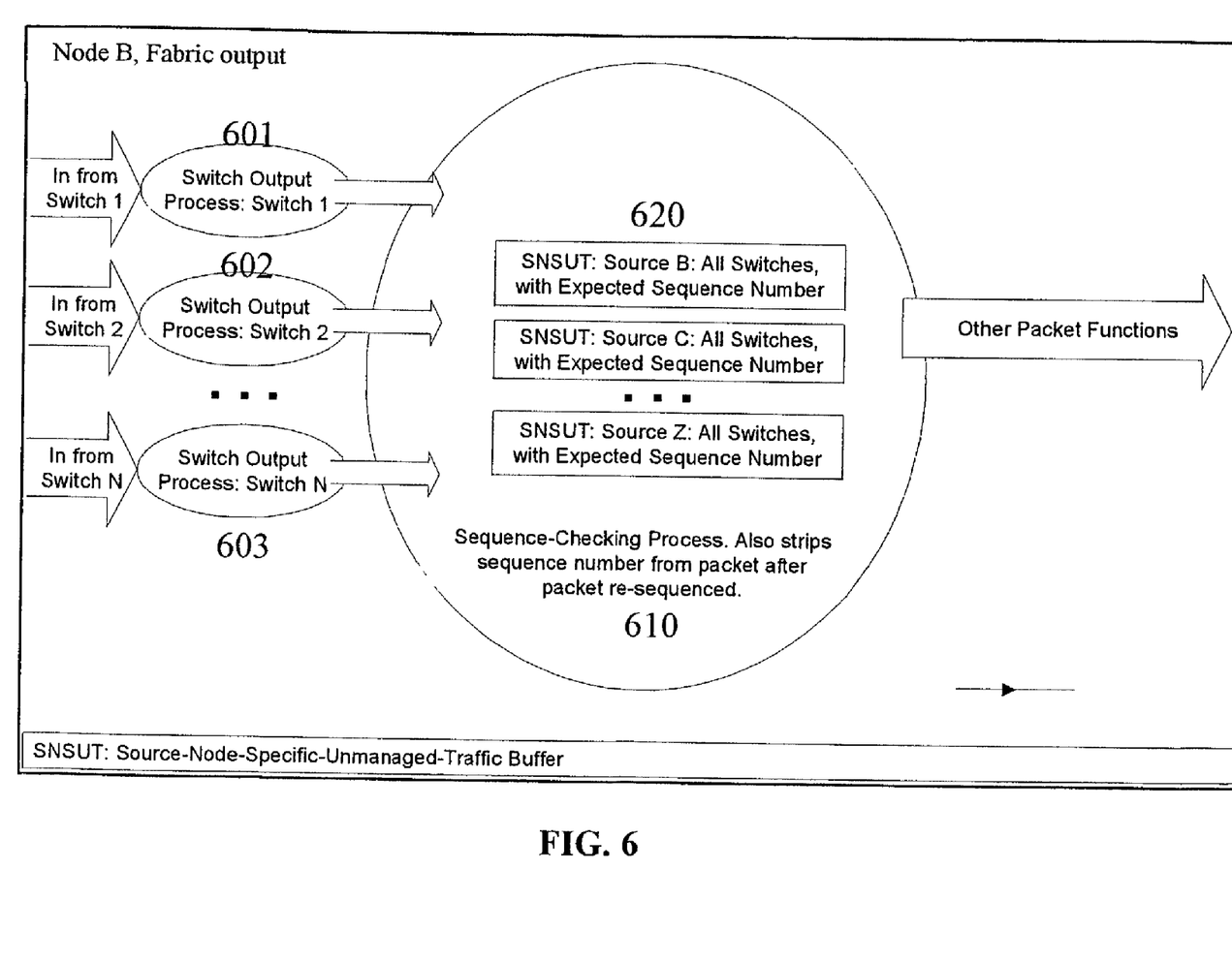
FIG. 6 illustrates packets transmitted from source node A, through a switch fabric to a fabric output are acted upon by a switch output process at destination node B according to an embodiment of the present invention.

At the destination node packets transmitted through the switch fabric are sorted by the Switch Output Process 601, 602, 603 and sent to intended output queues. See FIG. 6.

The invention utilizes available bandwidth by multiplexing managed and unmanaged traffic flows across a multi-star Infiniband switch network. To provide Quality of Service the network traffic is differentiated. The use of a switch fabric provides multiple levels of redundancy. A randomization function is used to smooth out the differentiated traffic flow.

While the description above refers to particular embodiments of the present invention, it will be understood that many modifications may be made without departing from the spirit thereof The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A method of inverse multiplexing managed traffic flows over a multi-star switch network, comprising:

classifying incoming traffic based on flow parameters to form classified flows, and embedding the flow parameters in a routing table in a source node for a flow;

placing packets from the classified flows into a plurality of Switch-Specific Managed-Traffic Queue Sets (SSMTs) and an unmanaged traffic queue set;

selecting such that a Switch Input Scheduler Process for a switch selects all managed packets available from one of the SSMTs, then selects a single unmanaged packet from the unmanaged traffic queue set to form selected packets; and transmitting selected packets from the classified flows from the source node through a multi-star switch fabric to a destination node, wherein the multi-star switch fabric includes a switch that is connected to every node therein, but is not connected to any other switch.

2. The method according to claim 1, wherein the flow parameters define the source node, a path, a backup path, a selected switch, a backup switch, the destination node, and whether the flow is managed or unmanaged.

3. The method according to claim 2, wherein a source node classifier, using a traffic engineering algorithm, classifies the incoming traffic based on the flow parameters, embeds the flow parameters in the routing table in the source node for the flow, and places packets from the classified flows into the SSMTs and the unmanaged traffic queue set.

4. The method according to claim 3, wherein the traffic engineering algorithm classifies based on bandwidth that the flow requires.

5. A method of inverse multiplexing managed traffic flows over a multi-star switch network, comprising:

classifying, using a traffic engineering algorithm, incoming traffic based on flow parameters to form classified flows, and embedding the flow parameters in a routing table in a source node for a flow, wherein the traffic engineering algorithm classifies based on bandwidth that the flow requires;

placing packets from the classified flows into a plurality of Switch-Specific Managed-Traffic Queue Sets (SSMTs) and an unmanaged traffic queue set;

selecting such that a Switch Input Scheduler Process for a switch selects all managed packets available from one of the SSMTs, then selects a single unmanaged packet from the unmanaged traffic queue set to form selected packets;

transmitting selected packets from the classified flows from the source node through a multi-star switch fabric to a destination node, wherein the multi-star switch fabric includes a switch that is connected to every node therein, but is not connected to any other switch and wherein a Bandwidth Negotiated Managed Traffic (BNMT) flow has a known bandwidth requirement.

6. A method of inverse multiplexing managed traffic flows over a multi-star switch network, comprising:

classifying, using a traffic engineering algorithm, incoming traffic based on flow parameters to form classified flows, and embedding the flow parameters in a routing table in a source node for a flow, wherein the traffic engineering algorithm classifies based on bandwidth that the flow requires;

placing packets from the classified flows into a plurality of Switch-Specific Managed-Traffic Queue Sets (SSMTs) and an unmanaged traffic queue set;

selecting such that a Switch Input Scheduler Process for a switch selects all managed packets available from one of the SSMTs, then selects a single unmanaged packet from the unmanaged traffic queue set to form selected packets;

transmitting selected packets from the classified flows from the source node through a multi-star switch fabric to a destination node, wherein the multi-star switch fabric includes a switch that is connected to every node therein, but is not connected to any other switch and wherein an Un-negotiated Managed Traffic (UMT) flow having a unknown bandwidth requirement, is considered part of an aggregate for which the bandwidth is known or is placed initially in a queue for a selected switch, the UMT bandwidth is measured, and the measured bandwidth is used to correct the initial placement.

7. The method according to claim 2, wherein the selecting includes moving, by the Switch Input Scheduler Process, selected packets from the classified flows from the SSMT and the unmanaged traffic queue set, to the selected switch.

8. The method according to claim 1, wherein the selecting, by the Switch Input Scheduler Process, includes a randomization function.

9. The method according to claim 1, wherein the source node has the Switch Input Scheduler Process for the switch.

10. A program code storage device, comprising:
a computer-readable storage medium; and
computer-readable program code, stored on the computer-readable storage medium, which when executed causes a computer to classify incoming traffic based on flow parameters to form classified flows, embed flow parameters in a routing table in a source node for a flow, place packets from the classified flows into a plurality of Switch-Specific Managed-Traffic Queue sets (SSMTs) and an unmanaged traffic queue set,
select such that a Switch Input Scheduler Process for a switch selects all managed packets available from one of the SSMTs first, then selects a single unmanaged packet from the unmanaged traffic queue set to form selected packets, and
transmit the selected packets from the classified flows from the source node through a multi-star switch fabric to a destination node wherein the multi-star switch fabric includes a switch that is connected to every node therein, but is not connected to any other switch.

11. The program code storage device according to claim 10, wherein the flow parameters define the source node, a path, a backup path, a selected switch, a backup switch, the destination node, and whether the flow is managed or unmanaged.

12. The program code storage device according to claim 10, wherein a source node classifier, using a traffic engineering algorithm, classifies the incoming traffic based on the flow parameters, embeds the flow parameters in the routing table in the source node for the flow, and places packets from the classified flows into the SSMTs and the unmanaged traffic queue set.

13. The program code storage device according to claim 12, wherein the traffic-engineering algorithm classifies based on bandwidth that the flow requires.

14. A program code storage device, comprising:
a computer-readable storage medium; and
computer-readable program code, stored on the computer-readable storage medium, which when executed causes a computer to
classify, using a traffic engineering algorithm, incoming traffic based on flow parameters to form classified flows, wherein the traffic engineering algorithm classifies based on bandwidth that the flow requires,
embed flow parameters in a routing table in a source node for a flow,
place packets from the classified flows into a plurality of Switch-Specific Managed-Traffic Queues sets (SSMTs) and an unmanaged traffic queue set,
select such that a Switch Input Scheduler Process for a switch selects all managed packets available from one of the S SMTs first, then selects a single unmanaged packet from the unmanaged traffic queue set to form selected packets, and
transmit the selected packets from the classified flows from the source node through a multi-star switch fabric to a destination node,
wherein the multi-star switch fabric includes a switch that is connected to every node therein, but is not connected to any other switch and wherein a Bandwidth Negotiated Managed Traffic (BNMT) flow has a known bandwidth requirement.

15. A program code storage device, comprising:
a maehinecomputer-readable storage medium; and
computer-readable program code, stored on the computer-readable storage medium, which when executed causes a computer to
classify, using a traffic engineering algorithm, incoming traffic based on flow parameters to form classified flows, wherein the traffic engineering algorithm classifies based on bandwidth that the flow requires,
embed flow parameters in a routing table in a source node for a flow,
place packets from the classified flows into a plurality of Switch-Specific Managed-Traffic Queues sets (SSMTs) and an unmanaged traffic queue set,
select such that a Switch Input Scheduler Process for a switch selects all managed packets available from one of the SSMTs first, then selects a single unmanaged packet from the unmanaged traffic queue set to form selected packets, and
transmit the selected packets from the classified flows from the source node through a multi-star switch fabric to a destination node,
wherein the multi-star switch fabric includes a switch that is connected to every node, therein, but is not connected to any other switch and wherein a Un-negotiated Managed Traffic (UMT) flow having a unknown bandwidth requirement, is considered part of an aggregate for which the bandwidth is known or is placed initially in a queue for a selected switch, the UMT bandwidth is measured, and the measured bandwidth is used to correct the initial placement.

16. The program code storage device according to claim 11, wherein the Switch Input Scheduler Process moves packets from the SSMTs and the unmanaged traffic queue set, to the selected switch.

17. The program code storage device according to claim 10, wherein the Switch Input Scheduler Process includes a randomization function.

18. The program code storage device according to claim 10, wherein the source node has a Switch Input Scheduler Process for the switch.

19. A multi-star switch network, comprising:
a multi-star switch fabric including a switch that is connected to every node therein, but is not connected to any other switch;
an input device, connected to the switched fabric, having a routing table, a plurality of Switch-Specific Managed-Traffic Queues Sets (SSMTs), an unmanaged traffic queue set, and a Switch Input Scheduler, wherein the input device classifies incoming traffic based on flow parameters to form classified flows, embeds the flow parameters in the routing table for a flow, places packets from the classified flows into the SSMTs and the unmanaged traffic queue set, selects such that the Switch Input Scheduler for a switch selects all managed packets available from one of the SSMTs, then selects a single unmanaged packet from the unmanaged traffic queue set to form selected packets, transmits the selected packets for the classified flows from the input device through the switch fabric to an output device; and the output device, connected to the switched fabric, contains a switch output process that sorts the classified flows received from a fabric output, and sends the classified flows to an intended output queue.

20. The multi-star switch network according to claim 19, wherein the flow parameters include the input device, a path, a backup path, a selected switch, a backup switch, the output device, and whether the flow is managed or unmanaged.

21. The multi-star switch network according to claim 20, wherein the input device classifies, using a traffic engineering algorithm, the incoming traffic based on the flow parameters, embeds the flow parameters in the routing table for the flow, and places the packets from the classified flows into the SSMTs and the unmanaged traffic queue set.

22. The multi-star switch network according to claim 21, wherein the traffic-engineering algorithm classifies based on bandwidth that the flow requires.

23. A multi-star switch network, comprising:
a multi-star switch fabric including a switch that is connected to every node therein, but is not connected to any other switch;
an input device, connected to the switched fabric, having a routing table, a plurality of Switch-Specific Managed-Traffic Queues Sets (SSMTs), an unmanaged traffic queue set, and a Switch Input Scheduler, wherein the input device classifies incoming traffic based on flow parameters to form classified flows, embeds the flow parameters in the routing table for a flow, places packets from the classified flows into the SSMTs and the unmanaged traffic queue set, selects such that the Switch Input Scheduler for a switch selects all managed packets available from one of the SSMTs, then selects a single unmanaged packet from the unmanaged traffic queue set to form selected packets, transmits the selected packets for the classified flows from the input device through the switch fabric to an output device; and the output device, connected to the switched fabric, containing a switch output process that sorts the classified flows received from a fabric output, and sends the classified flows to an intended output queue, wherein a Bandwidth Negotiated Managed Traffic (BNMT) flow has a known bandwidth requirement.

24. A multi-star switch network, comprising:
a multi-star switch fabric including a switch that is connected to every node therein, but is not connected to any other switch;
an input device, connected to the switched fabric, having a routing table, a plurality of Switch-Specific Managed-Traffic Queues Sets (SSMTs), an unmanaged traffic queue set, and a Switch Input Scheduler, wherein the input device classifies incoming traffic based on flow parameters to form classified flows, embeds the flow parameters in the routing table for a flow, places packets from the classified flows into the SSMTs and the unmanaged traffic queue set, selects such that the Switch Input Scheduler for a switch selects all managed packets available from one of the SSMTs, then selects a single unmanaged packet from the unmanaged traffic queue set to form selected packets, transmits the selected packets for the classified flows from the input device through the switch fabric to an output device; and the output device, connected to the switched fabric, containing a switch output process that sorts the classified flows received from a fabric output, and sends the classified flows to an intended output queue, wherein a Un-negotiated Managed Traffic (UMT) flow having a unknown bandwidth requirement, is considered part of an aggregate for which the bandwidth is known or is placed initially in a queue for a selected switch, the UMT bandwidth is measured, and the measured bandwidth is used to correct the initial placement.

25. The multi-star switch network according to claim 20, wherein the Switch Input Scheduler moves packets from the SSMTs and the unmanaged traffic queue set to the selected switch.

26. The multi-star switch network according to claim 19, wherein the Switch Input Scheduler includes a randomization function.

27. The multi-star switch network according to claim 19, wherein the input device has the Switch Input Scheduler for the switch.

28. The method according to claim 1, further comprising receiving of the classified flows by the destination node, wherein a switch output process sorts the classified flows received from a fabric output, and sends the classified flows to an intended output queue.

29. The method according to claim 5, further comprising receiving of the classified flows by the destination node, wherein a switch output process sorts the classified flows received from a fabric output, and sends the classified flows to an intended output queue.

30. The method according to claim 6, further comprising receiving of the classified flows by the destination node, wherein a switch output process sorts the classified flows received from a fabric output, and sends the classified flows to an intended output queue.

31. The program code storage device according to claim 10, wherein the machine readable program code includes instruction to receive the classified flows in the destination node, wherein a switch output process sorts the classified flows received from a fabric output, and sends classified flows to an intended output queue.

32. The program code storage device according to claim 14, wherein the machine readable program code includes instruction to receive the classified flows in the destination node, wherein a switch output process sorts the classified flows received from a fabric output, and sends classified flows to an intended output queue.

33. The program code storage device according to claim 15, wherein the machine readable program code includes instruction to receive the classified flows in the destination node, wherein a switch output process sorts the classified flows received from a fabric output, and sends classified flows to an intended output queue.

* * * * *